United States Patent [19]
Poirel

[11] Patent Number: 6,161,027
[45] Date of Patent: Dec. 12, 2000

[54] TELECOMMUNICATION APPARATUS COMPRISING A PERIPHERAL RECOGNITION DEVICE

[75] Inventor: Alain Poirel, Saint Quen En Belin, France

[73] Assignee: U.S. Philips Corporation, New York, N.Y.

[21] Appl. No.: 09/025,374

[22] Filed: Feb. 18, 1998

[30] Foreign Application Priority Data

Feb. 25, 1997 [FR] France .................................. 97 02224

[51] Int. Cl.⁷ .................................................. H04B 1/38
[52] U.S. Cl. ................................... 455/572; 455/127
[58] Field of Search ................................ 455/550, 572, 455/573, 574, 575, 127, 277.1, 129; 320/110, 103, 114

[56] References Cited

U.S. PATENT DOCUMENTS

| 5,164,652 | 11/1992 | Johnson et al. | 455/575 |
| 5,574,987 | 11/1996 | Wallace | 455/575 |
| 5,999,829 | 12/1999 | Chun et al. | 455/572 |

FOREIGN PATENT DOCUMENTS

WO9519096  7/1995  European Pat. Off. ......... H04Q 7/32

*Primary Examiner*—Thanh Cong Le

[57] ABSTRACT

A main apparatus has power supply terminals for supplying power to a peripheral and a recognition device for recognizing various types of peripherals by simply connecting said peripheral between said terminals and for selecting a power supply voltage as a function of the impedance of said peripheral between these terminals.

9 Claims, 4 Drawing Sheets

TELECOMMUNICATION APPARATUS COMPRISING A PERIPHERAL RECOGNITION DEVICE

BACKGROUND OF THE INVENTION

The invention relates to a telecommunication apparatus having power supply terminals for supplying power to a peripheral which has an electrical signature and a recognition device for recognizing a peripheral connected between said terminals.

The invention likewise relates to any other apparatus having power supply terminals for supplying power to a peripheral which has an electrical signature and a recognition device for recognizing a peripheral connected between said terminals.

The accessories or peripherals of portable telephones which are currently available on the market for various specific applications (hands-free kit, portable computer, fax, etc.) do not all function with the same supply voltage. Moreover, certain of these accessories are adapted to a telephone model or to a particular maker. For correctly supplying power to these various peripherals, the main apparatus thus has a connector with various pins among which a supply pin, a ground pin and as many dedicated pins as there are peripherals likely to be connected to said apparatus. Indeed, it is absolutely necessary to identify these accessories during their connection via a specific identification pin so as to avoid an unadapted voltage being applied to them and running the risk of damaging them.

An apparatus comprising an identification device which permits of identifying various types of batteries via a unique identification pin is already known. It works with standardized power supply batteries which have a characteristic identification resistor and an identification pin.

If this system provides the advantage of utilizing a unique identification pin (in addition to the two power supply pins) for recognizing a peripheral (a battery in this case), it has nevertheless drawbacks. The system indeed requires that the main apparatus comprise a microcontroller and that all the peripherals comprise a characteristic identification resistor whose value is preprogrammed in the microcontroller. Moreover, the system makes it necessary to reserve a specific identification pin among the pins available on the connector of the main apparatus. The connectors provided on most of the telecommunication apparatus are already full and the reservation of an identification pin forces one to use connectors with a large number of pins.

Thus, it is no longer possible to connect new peripherals without increasing the number of pins of the standard connectors.

OBJECTS AND SUMMARY OF THE INVENTION

It is an object of the present invention to provide a telecommunication apparatus comprising means for recognizing various types of peripherals by simply connecting said peripheral between the power supply pin and the ground pin of said apparatus.

Therefore, a telecommunication apparatus of the type mentioned in the opening paragraph is characterized in that the electrical signature is formed by the impedance of said peripheral seen between said power supply terminals.

According to an interesting characteristic feature of the invention, a telecommunication apparatus of the type mentioned above is characterized in that the recognition device for recognizing peripherals comprises:

measuring means for measuring the impedance of the peripheral seen between said power supply terminals, automatic selection means for selecting a supply voltage for applying to said peripheral the supply voltage which is adequate as a function of the measured impedance.

According to a preferred embodiment of the invention, said measuring means comprise a low-value current generator for generating a current that has a very low strength across the peripheral connected between the power supply terminals and a measuring device for measuring the voltage developed between said terminals for determining the impedance of said peripheral between these terminals.

These and other aspects of the invention will be apparent from and elucidated with reference to the embodiments described hereinafter.

DETAILED DESCRIPTION OF THE PREFERRED EMBODIMENT

Figure 1A:
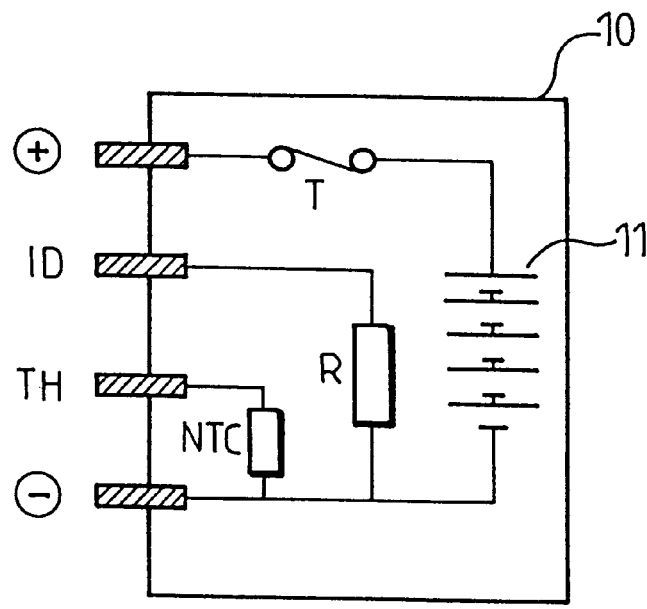
FIG. 1 represents a battery-type of identification device according to the prior art.
Figure 1B:
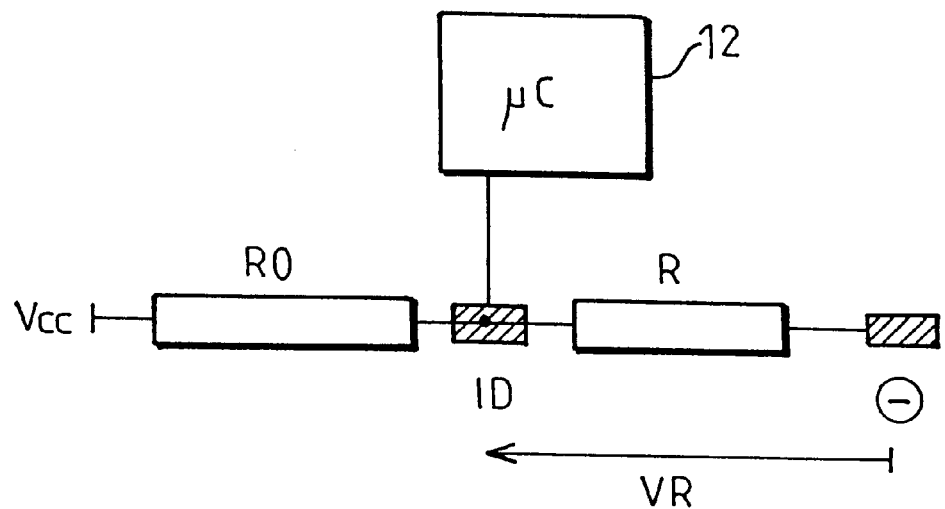

The battery-type of identification device known from the prior art represented in A in FIG. 1 comprises on the outside of the housing 10 four connecting pins of which a "+" pin is used for the positive potential, an ID pin for identification, a TH pin for testing the temperature and a "−" pin for the negative potential. Inside the housing 10, the device comprises a thermal switch T, a power supply battery 11, a resistor R characteristic of the type of battery and a protection resistor NTC of about 10 kOhms. The resistor R is connected between the "−" terminal of the battery and the ID identification pin.

During the connection of the housing 10 to a main apparatus, as represented in B in FIG. 1, the characteristic resistor R is connected in series to another resistor R0, inside said apparatus, connected to a constant potential node Vcc. In this manner a voltage divider bridge is obtained between the "−" pin and the ID identification pin. The voltage VR observed between these pins, which depends on the value of the resistor R, is applied to an input port of a microcontroller 12 of the main apparatus to effect the recognition of the type of battery.

Figure 2:
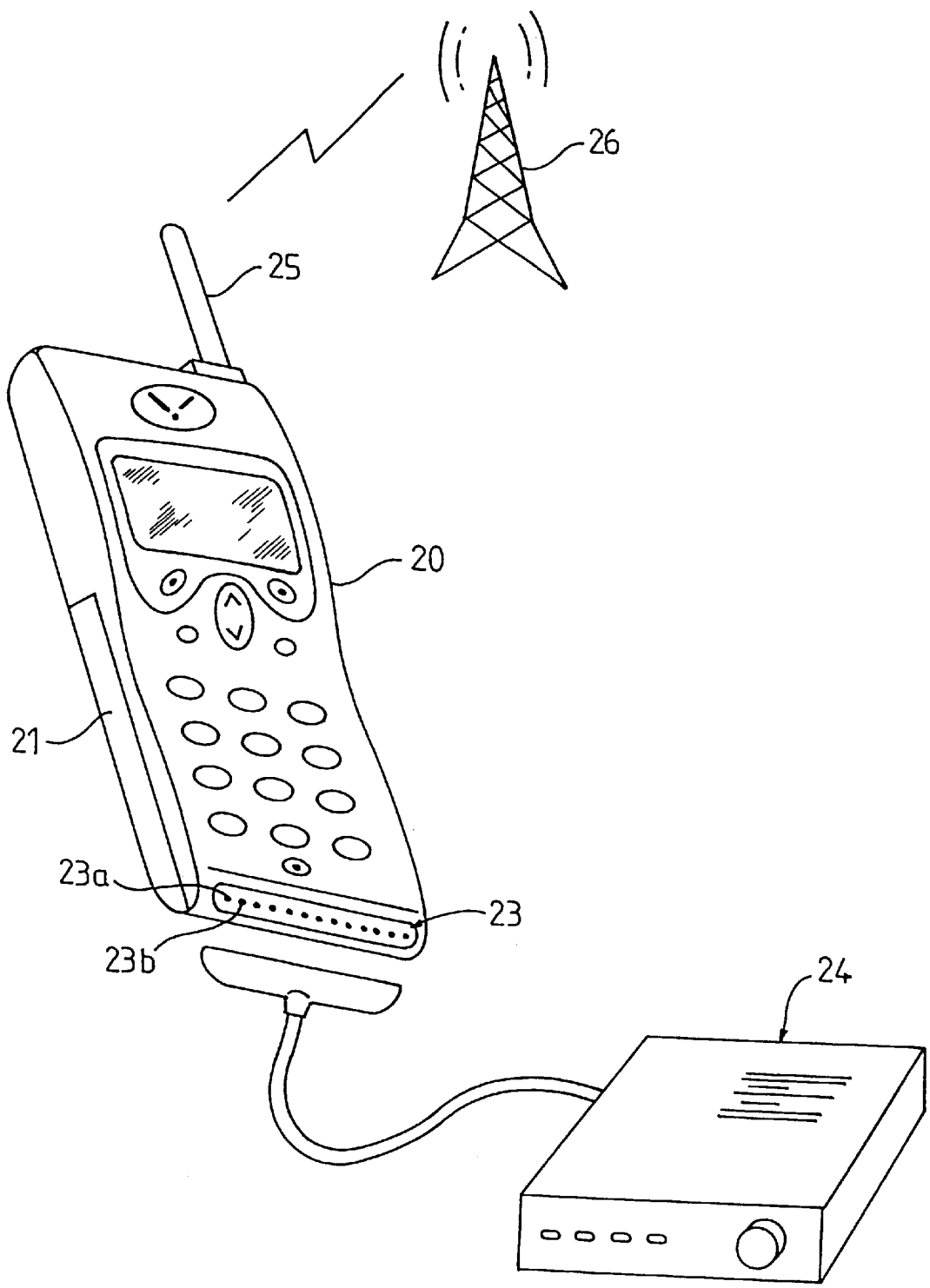
FIG. 2 represents a telecommunication apparatus according to the invention.

The main apparatus represented in FIG. 2 is a radio telephone, but the peripheral recognition device according to the invention may be applied to any other portable apparatus whose power is supplied by a supply voltage.

The radio telephone 20 comprises a housing 21 enclosing a power supply battery and a peripheral recognition device according to the invention, a connector 23 having various connecting pins among which a supply pin 23a and a ground pin 23b, a peripheral 24 and a transceiver device co-operating with an antenna 25 for exchanging radio signals with the base site 26.

The peripheral recognition device connected to the pin 23a permits to detect and identify the peripheral 24 connected between the pins 23a and 23b thanks to an impedance measuring device and to feed the peripheral 24 with the supply voltage adapted to its power consumption thanks to an automatic supply voltage selection device.

Figure 3:
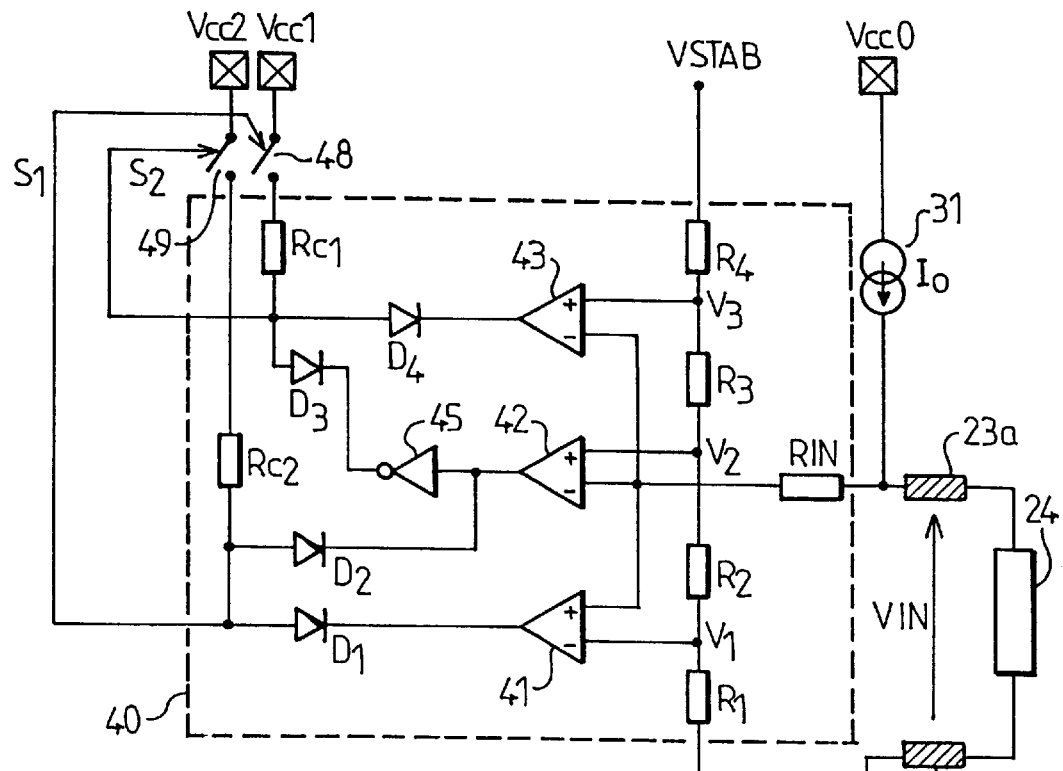
FIG. 3 is a full diagram of a peripheral recognition device according to a first embodiment of the invention which utilizes discrete components.

The principle of the invention consists of generating a low-value current through the peripheral 24, measuring the voltage on its terminals, deriving therefrom its impedance (generally comprised between 500 Ohms and several dozen of kOhms), and then its supply voltage. The diagram of FIG. 3 gives a detailed representation of a peripheral recognition device utilizing essential means for embodying the invention in the simple cases where there is a single peripheral to be identified.

In the absence of load between the supply terminals 23$a$ and 23$b$, the voltage VIN read between these terminals is that of the imperfect generator. When a particular peripheral is connected, the reflected voltage VIN is analyzed by a window detector 30 for evaluating the impedance of said peripheral between said terminals.

A low-value current generator 31 connected between the pin 23$a$ and a potential node Vcc0, sends a low current $I_o$ via pin 23$a$ to the peripheral 24, so that the latter develops a voltage VIN on its terminals, characteristic of its own impedance. The voltage VIN then presented on terminal 23$a$ imposes on the node C, protected by a resistor RIN, a voltage which is compared by comparators 34 and 35 with reference voltage thresholds 36 and 37 which represent a high reference voltage (H) and a low reference voltage (B), respectively. Depending on the result of the comparison obtained on the output S1 of a logic arbiter circuit 38, a semiconductor switch 39 may be closed to select a supply voltage Vcc1 through a protective resistor Rc1 in the direction of the identified peripheral 24.

As the current intended for the recognition of the characteristic impedance of said peripheral has a lower strength than the normal supply current the voltage VIN becomes higher than that measured during the identification, once power has correctly been applied to the peripheral 24. It is thus imperative that the thresholds H and B of the window detector 30 be modified immediately after the identification, so as to avoid oscillations caused by the variations of the voltage VIN during the power supply.

In order to ensure an active protection against short-circuits, on the one hand, and overloads and disconnections, on the other hand, the voltage VIN is permanently analyzed and the detection thresholds H and B of the window detector 30 are adjusted in consequence. In the cases of short-circuits or very low load impedance (VIN lower than the low reference threshold) and in the case of a disconnection of the peripheral 24 (VIN higher than the high reference threshold), the recognition device cuts off the power supply of the load. When VIN is situated between the two reference thresholds, the power supply of the peripheral will be maintained.

Figure 4:
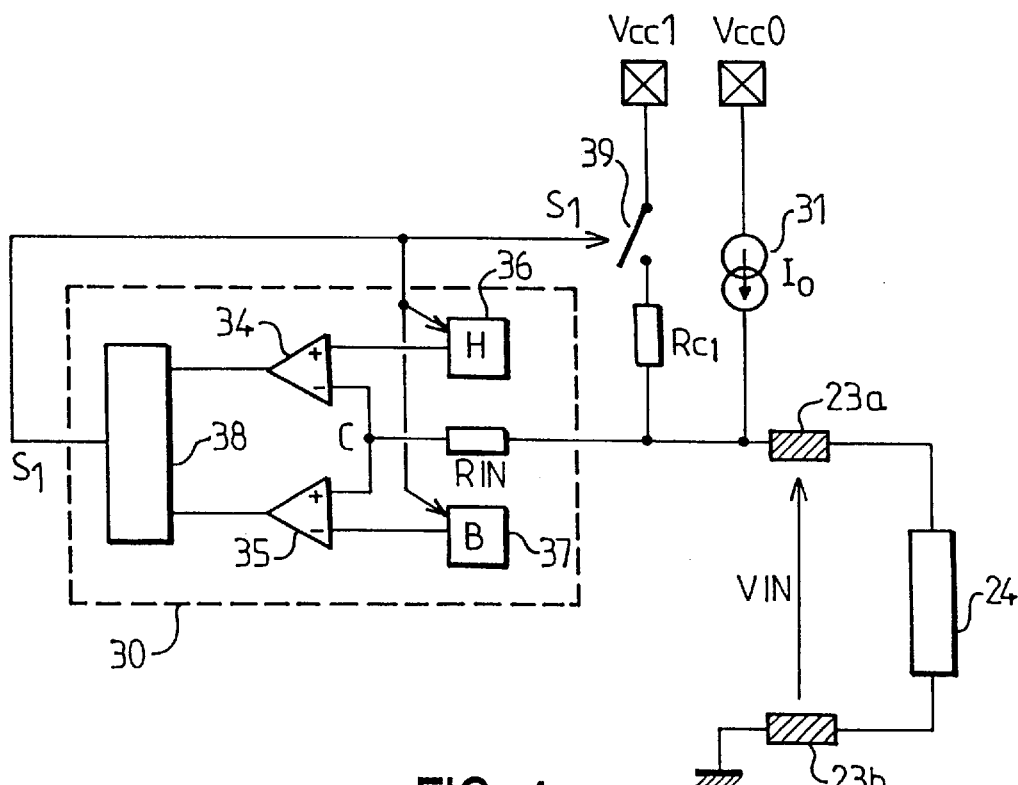
FIG. 4 represents a variant of the embodiment shown in FIG. 3.

FIG. 4 illustrates a variant of the embodiment described above for recognizing two types (type 1 and type 2) of peripherals which have a different characteristic impedance and a different supply voltage. A type-1 peripheral is fed with a voltage Vcc1 via the resistor Rc1 and a switch 48, whereas a type-2 peripheral is fed with a voltage Vcc2 via a resistor Rc2 and a switch 49. Four situations instead of the three preceding situations detected by a simple detector 30 are to be detected here. For solving this more complex problem, the double window detector 40 is used.

The device 40 is formed by three comparators 41, 42, 43 of which one input is connected to respective potential nodes V1, V2 and V3 connected in series with resistors R1, R2, R3 and R4 between ground and a constant voltage VSTAB. The output signals of the comparators enter a combinatorial circuit formed by diodes D1, D2, D3, D4 and an inverter 45 for controlling the switches 48 and 49 through the outputs S1 and S2. The device 40 recognizes a peripheral when its input voltage VIN lies between V1 and V3 with V1<V2<V3<VSTAB. If VIN<V1, the device 40 detects a short-circuit at the level of the load and cuts off the power supply so as not to damage the main apparatus. If V1<VIN<V2, the device 40 recognizes the presence of a type-1 peripheral and if V2<VIN<V3 it recognizes a type-2 peripheral. On the other hand, if VIN>V3, the device 40 detects an open circuit and cuts off the power supply.

The following Table summarizes these four situations defined by the pairs (S1; S2) as a function of the load voltage VIN and of the reference thresholds V1, V2 and V3.

| S1 | S2 | VIN | Detection |
| --- | --- | --- | --- |
| 0 | 0 | VIN < V1 | short-circuit |
| 1 | 0 | V1 < VIN < V2 | type 1 |
| 0 | 1 | V2 < VIN < V3 | type 2 |
| 0 | 0 | VIN > V3 | open circuit |

All the elements necessary for this embodiment are easily integrable in a single integrated circuit of the analog ASIC type (Application Specific Integrated Circuit), including the power switches 39, 48, 49 and the current measuring resistors R1, R2, R3, R4. It is also possible to render the detection thresholds V1, V2, V3 and the supply voltages Vcc1 and Vcc2 programmable via external components or DACs (Digital Analog Converter) which are programmable through a 2 or 3-wire IIC bus or microwire bus in order to render the circuit more universal.

Figure 5:
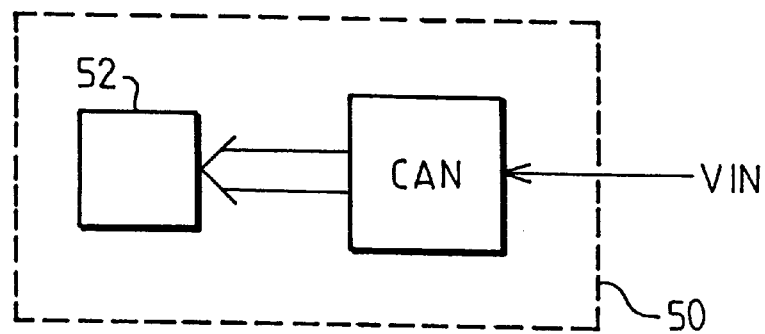
FIG. 5 illustrates a second embodiment of the peripheral impedance measuring device according to the invention.

According to a second embodiment of the invention represented in FIG. 5, the impedance measuring device (30, 40) may advantageously be replaced by a device 50 formed by a digital/analog converter (CAN) with 8 information bits, for example, co-operating with a microprocessor or a logic arbiter 52 for recognizing a larger number of peripherals.

The device 50 is particularly cost-effective in the case of an application to a radio telephone of the GSM type (Global Standard for Mobile communications) or to any other terminal comprising complex integrated circuits among which a microprocessor and a CAN having a free input.

The voltage VIN is thus applied to the free input of the CAN and as a function of the 8-bits code obtained on the output of the CAN, the element 52 identifies the type of the peripheral placed at the input of the device 50. The following Table gives several examples of digital values (codes) read from the output of the CAN representing, respectively, fractions of the measured input voltage VIN. For example, for an output code comprised between 10 and 50, the measured voltage VIN lies between 10/256 volts and 50/256 volts, which corresponds to the detection of a type-1 peripheral.

| Code | Detection |
| --- | --- |
| [0; 10] | shortcircuit |
| [10; 50] | type 1 |
| [50; 150] | type 2 |
| [150; 240] | type 3 |
| [240; 255] | open circuit |

Figure 6A:
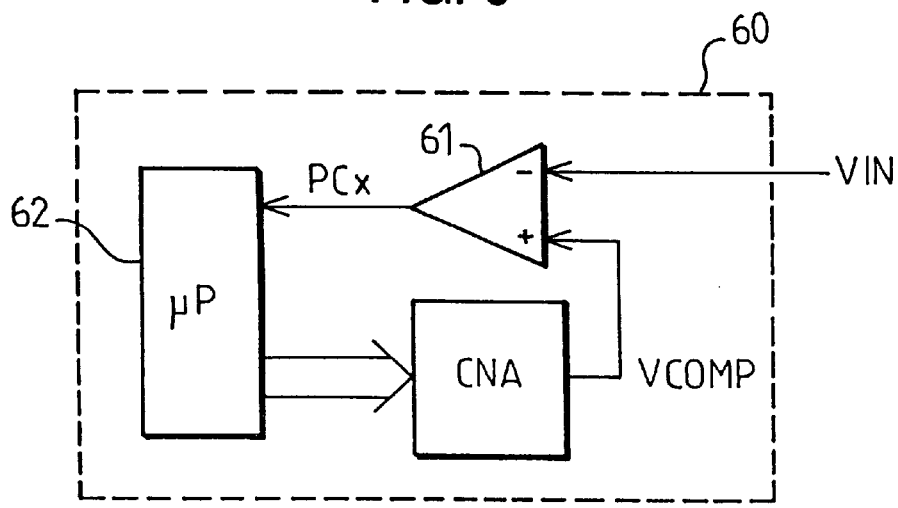
FIG. 6 illustrates a third embodiment of the impedance measuring device according to the invention.
Figure 6B:
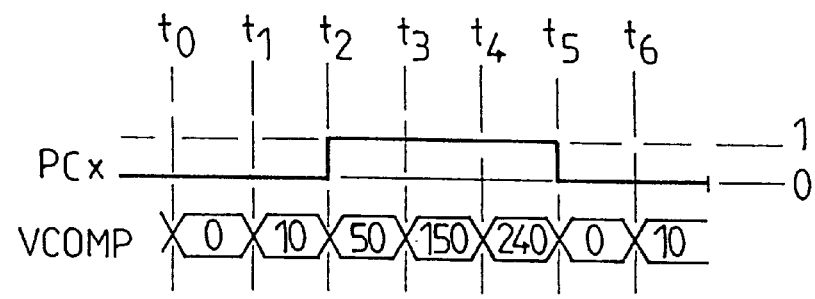

A third embodiment of the impedance measuring device 60 according to the invention is represented in A in FIG. 6 and comprises an analog/digital converter (CNA) and also a comparator 61 and a microprocessor 62. VIN is applied to the negative input of the comparator 61, whereas its positive input is connected to the output Vcomp of the CNA whose inputs are connected to outputs of the microprocessor 62. The voltage VIN is compared to reference values computed by the microprocessor 62 and converted into voltages Vcomp by the CNA. The result of the comparison PCx is sent to the input of the microprocessor 62 so as to determine whether the measured voltage VIN corresponds to a known peripheral.

FIG. 6 also shows in B a timing diagram representing the level of the output PCx as a function of the digital value written by the microprocessor 62 in the CNA. At the instant t1 (VCOMP1=10/255 and PCx=0), while the voltage VIN is higher than VCOMP, the microprocessor 62 increases the reference level to be detected. At the instant t2 (VCOMP2=50/255 and PCx=1), the new reference threshold has been detected and has caused the comparator to switch to indicate that VIN<VCOMP2. From this is derived that VCOMP1<VIN<VCOMP2 and that the load is of a known type.

For a number N of known types of peripherals, N+2 detection tests are necessary for identifying the connected peripheral. A later software filtering of the anti-rebound type or majority decision type may be useful to avoid an erroneous detection when one disconnects a peripheral to connect another.

According to a variant of this embodiment, the digital/analog converter may advantageously be realized by a PWM output (Pulse Width Modulation) of an automatically recharged counter (or timer). This type of counter is often used in commercial microcontrollers.

Thus, a peripheral recognition device which is cost-effective in terms of connecting pins and capable of ensuring an active protection against short-circuits, the overloads and the unwanted disconnections have just been described in detail. Of course, the invention is not restricted to the embodiments proposed by way of example; other variants of embodiments of the invention will be apparent to the man or woman skilled in the art, more particularly for realizing a window detector (30, 40) or a technical equivalent (50, 60), while these variants are within the scope of the invention.

What is claimed is:

1. A telecommunication apparatus having power supply terminals for supplying power to a peripheral which has an electrical signature, and a recognition device for recognizing a peripheral connectable between the power supply terminals, the electrical signature being formed by an impedance of said peripheral seen between said terminals, said recognition device comprising measuring means for measuring said impedance when said peripheral is connected to said terminals, and automatic selection means for selecting a supply voltage for applying to said peripheral, said supply voltage being a function of said measured impedance.

2. A telecommunication apparatus as claimed in claim 1, said measuring means comprising a low-value current generator for generating a current that has a low strength through said peripheral when connected between said power supply terminals, and a measuring device for measuring a voltage developed between said terminals for determining said impedance.

3. A telecommunication apparatus having power supply terminals for supplying power to a peripheral which has an electrical signature, and a recognition device for recognizing a peripheral connectable between the power supply terminals, the electrical signature being formed by an impedance of said peripheral seen between said terminals, said recognition device comprising measuring means for measuring said impedance when said peripheral is connected to said terminals, comparing means for comparing said measured impedance with reference values, and switch means for selecting a supply voltage for applying to said peripheral, said supply voltage being a function of said comparing.

4. An apparatus comprising:

a power supply providing a plurality of selectable supply voltages;

power supply terminals for providing a supply voltage to a peripheral device, said peripheral device having an electrical signature formed by an impedance seen between said power supply terminals when said peripheral device is connected to said power supply terminals;

a recognition and voltage selection device configured to recognize whether said peripheral is connected to said power supply voltage terminals through measurement of said impedance, and to select a selected one of said plurality of selectable supply voltages as said supply voltage.

5. An apparatus as claimed in claim 4, further comprising a current generator for generating a current through said peripheral when connected between said power supply terminals, and a window detector that windows a voltage developed across said power supply terminals by said current between at least two window threshold values, and that, in dependence of said windowing, provides a selection signal that selects said selected one of said plurality of selectable supply voltages as said supply voltage.

6. An apparatus as claimed in claim 4, further comprising a current generator for generating a current through said peripheral when connected between said power supply terminals, an analog-to-digital converter, and processing means, said analog-to-digital converter converting a voltage developed across said power supply terminals by said current, and said processing means, in dependence of said analog-to-digital conversion, providing a selection signal that selects said selected one of said plurality of selectable supply voltages as said supply voltage.

7. An apparatus as claimed in claim 6, wherein said processing means uses a look-up table for looking up said selection signal.

8. An apparatus as claimed in claim 4, further comprising a current generator for generating a current through said peripheral when connected between said power supply terminals, a comparator, a digital-to-analog converter, and processing means, said comparator at its input side being connected to said power supply terminals to compare a voltage developed across said power supply terminals by said current with a comparison voltage at an output of said digital-to-analog converter, and said processing means providing said comparison signal as a comparison result of said voltage with reference values, and, in dependence of said comparison result, providing a selection signal that selects said selected one of said plurality of selectable supply voltages as said supply voltage.

9. An apparatus as claimed in claim 4, said apparatus being a communication apparatus.

* * * * *